(12) United States Patent
Beronja (10) Patent No.: US 7,512,156 B2
(45) Date of Patent: Mar. 31, 2009

(54) DATA ALIGNMENT METHOD AND SYSTEM

(75) Inventor: Gerald S. Beronja, Lake Villa, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 959 days.

(21) Appl. No.: 11/010,288

(22) Filed: Dec. 14, 2004

(65) Prior Publication Data

US 2006/0126669 A1 Jun. 15, 2006

(51) Int. Cl.
*H04J 3/06* (2006.01)
*H04M 11/00* (2006.01)
*G01C 21/00* (2006.01)

(52) U.S. Cl. ............... 370/503; 370/241.1; 379/93.1; 701/206; 340/995.19

(58) Field of Classification Search ......... 370/241–254, 370/465, 503; 379/68, 69, 93.1; 360/6, 53; 701/101, 117, 206–300; 700/174, 218; 340/992–995, 340/995.19
See application file for complete search history.

(56) References Cited

U.S. PATENT DOCUMENTS

| | | | | |
|---|---|---|---|---|
| 4,602,127 A | * | 7/1986 | Neely et al. | ............ 379/68 |
| 4,992,947 A | * | 2/1991 | Nimura et al. | ............ 701/210 |
| 5,243,529 A | * | 9/1993 | Kashiwazaki | ............ 701/208 |
| 6,472,099 B1 | * | 10/2002 | Lee et al. | ............ 429/206 |
| 2002/0150050 A1 | * | 10/2002 | Nathanson | ............ 370/241 |

FOREIGN PATENT DOCUMENTS

| | | |
|---|---|---|
| DE | 102 07 222 | 10/2003 |
| EP | 2001125612 | 5/2001 |

\* cited by examiner

*Primary Examiner*—Afsar M. Qureshi
(74) *Attorney, Agent, or Firm*—McDermott Will & Emery LLP (57) ABSTRACT

A system and a machine-implemented method for receiving a real-time data signal from a real-time data source and a time-delayed data signal from a time-delayed data source. The real-time data signal and the time-delayed data signal are each monitored for the occurrence of a synchronization event. A time differential is determined between the occurrence of the synchronization event within the real-time data signal and the occurrence of the synchronization event within the time-delayed data signal.

32 Claims, 9 Drawing Sheets

DATA ALIGNMENT METHOD AND SYSTEM

TECHNICAL FIELD

This disclosure relates to data alignment systems and methodologies and, more particularly, to vehicular diagnostic data alignment systems and methodologies that allow for the chronological alignment of data from multiple data sources.

BACKGROUND

When diagnosing problems, technicians often use modern test equipment that provides the technician with graphical representations of data concerning the system being analyzed. For example, when analyzing the ignition system of a vehicle, an automotive technician may be provided with e.g., a data graph indicative of the engine RPM (i.e., rotations per minute). The data used to generate these graphs may be retrieved from multiple data sources, such as: a) the electronic control unit and b) an ignition wire of the motor vehicle being diagnosed. Unfortunately, these data sources may include both real-time data sources (e.g., the ignition wire) and time-delayed data sources (e.g., the electronic control unit), resulting in misaligned data graphs.

SUMMARY OF THE DISCLOSURE

In one implementation, a machine-implemented vehicular diagnostic method includes receiving a real-time data signal from a real-time data source and a time-delayed data signal from a time-delayed data source. The real-time data signal and the time-delayed data signal are each monitored for the occurrence of a synchronization event. A time differential is determined between the occurrence of the synchronization event within the real-time data signal and the occurrence of the synchronization event within the time-delayed data signal.

One or more of the following features may also be included. The real-time data source may be one or more diagnostic access points of a motor vehicle. The time-delayed data source may be an electronic control unit within a motor vehicle. The synchronization event may be a manually-initiated synchronization event or an automatically-initiated synchronization event. The time differential may be in the range of 0.0-3.0 seconds.

A real-time data graph representative of the real-time data signal and a time-delayed data graph representative of the time-delayed data signal may be simultaneously rendered on a display device. The real-time data graph and the time-delayed data graph may each be each plotted on a Cartesian plane having an x-axis representative of a unit of time and a y-axis representative of a signal amplitude.

One or more of the data graphs may be stored on a data store (e.g., a local data store and/or a remote data store). One or more of the data graphs may be retrieved from the data store.

The real-time data signal and the time-delayed data signal may be chronologically aligned by time shifting one of the real-time data signal and the time-delayed data signal by an amount of time essentially equal to the time differential. Chronologically aligning may include buffering the real-time data signal by an amount of time essentially equal to the time differential to generate a time-shifted real-time data signal. A real-time data graph representative of the time-shifted real-time data signal and a time-delayed data graph representative of the time-delayed data signal may be simultaneously rendered on a display device. The real-time data graph and the time-delayed data graph may each be plotted on a Cartesian plane having an x-axis representative of a unit of time and a y-axis representative of an amplitude. Chronologically aligning may include shifting the real-time data signal along the x-axis by an amount of time essentially equal to the time differential.

In another implementation, a computer program product residing on a computer readable medium has a plurality of instructions stored on it. When executed by the processor, these instructions cause that processor to receive a real-time data signal from a real-time data source and a time-delayed data signal from a time-delayed data source. The real-time data signal and the time-delayed data signal are monitored for the occurrence of a synchronization event. A time differential is determined between the occurrence of the synchronization event within the real-time data signal and the occurrence of the synchronization event within the time-delayed data signal.

One or more of the following features may also be included. The real-time data source may be one or more diagnostic access points of a motor vehicle. The time-delayed data source may be an electronic control unit within a motor vehicle. The data event may be a manually-initiated synchronization event or an automatically-initiated synchronization event. The time differential may be in the range of 0.0-3.0 seconds.

The computer program product may include instructions for simultaneously rendering, on a display device, a real-time data graph representative of the real-time data signal and a time-delayed data graph representative of the time-delayed data signal. The real-time data graph and the time-delayed data graph may each be plotted on a Cartesian plane having an x-axis representative of a unit of time and a y-axis representative of a signal amplitude.

The computer program product may include instructions for storing one or more of the data graphs on a data store (e.g., a local data store and/or a remote data store). The computer program product may include instructions for retrieving one or more of the data graphs from the data store.

The computer program product may include instructions for chronologically aligning the real-time data signal and the time-delayed data signal by time shifting one of the real-time data signal and the time-delayed data signal by an amount of time essentially equal to the time differential. The instructions for chronologically aligning may include instructions for buffering the real-time data signal by an amount of time essentially equal to the time differential to generate a time-shifted real-time data signal. The computer program product may include instructions for simultaneously rendering, on a display device, a real-time data graph representative of the time-shifted real-time data signal and a time-delayed data graph representative of the time-delayed data signal. The real-time data graph and the time-delayed data graph may each be plotted on a Cartesian plane having an x-axis representative of a unit of time and a y-axis representative of an amplitude. The instructions for chronologically aligning may include instructions for shifting the real-time data signal along the x-axis by an amount of time essentially equal to the time differential.

In another implementation, a data alignment system includes a data receiving device for receiving a real-time data signal from a real-time data source and a time-delayed data signal from a time-delayed data source. A data monitoring device monitors the real-time data signal and the time-delayed data signal for the occurrence of a synchronization event. A differential determination device determines a time differential between the occurrence of the synchronization event within the real-time data signal and the occurrence of the synchronization event within the time-delayed data signal.

One or more of the following features may also be included. A display device may simultaneously render a real-time data graph representative of the real-time data signal and a time-delayed data graph representative of the time-delayed data signal. The real-time data graph and the time-delayed data graph may each be plotted on a Cartesian plane having an x-axis representative of a unit of time and a y-axis representative of a signal amplitude. An alignment device may chronologically align the real-time data signal and the time-delayed data signal by time shifting one of the real-time data signal and the time-delayed data signal by an amount of time essentially equal to the time differential. The alignment device may include a data buffer for buffering the real-time data signal by an amount of time essentially equal to the time differential to generate a time-shifted real-time data signal. A display device may simultaneously render a real-time data graph representative of the time-shifted real-time data signal and a time-delayed data graph representative of the time-delayed data signal.

The details of one or more implementations are set forth in the accompanying drawings and the description below. Other features and advantages will become apparent from the description, the drawings, and the claims.

DETAILED DESCRIPTION OF THE EMBODIMENTS

Figure 1:
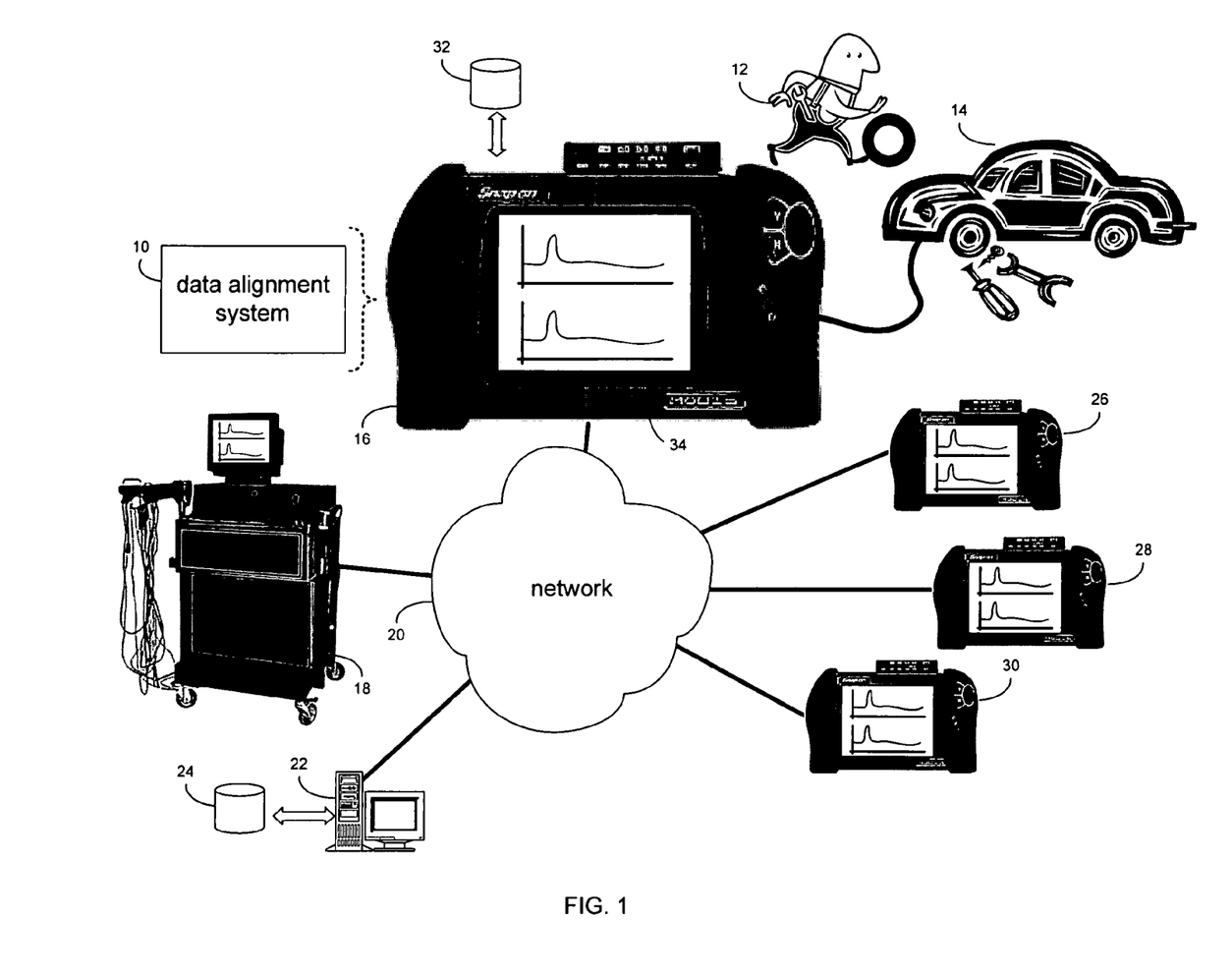
FIG. 1 is a diagrammatic view of a data alignment system coupled to a distributed computing network.

Referring to FIG. 1, there is shown a data alignment system 10 that renders multiple chronologically-aligned data graphs, each of which is generated (from a data signal received from a unique data source) during analysis of a device/system. In this example, the device/system being analyzed by technician 12 is a motor vehicle 14 (e.g., a car, truck or motorcycle). As will be discussed below in greater detail, data alignment system 10 monitors each of the data signal(s) received for the occurrence of a synchronization event, which is used to chronologically-align the data graphs generated from each data source.

Data alignment system 10 typically resides on and is executed by a handheld scanning/scope device 16 (e.g., a Snap-On MODIS Modular Diagnostic Information System™) or a modular diagnostic system 18 (e.g., a Sun Diagnostics SMP-4000 Modular Platform™).

Scanning/scope device 16 (or diagnostic system 18) may be a stand-alone system (i.e., a system that locally stores any required data) or a network-based system (i.e., a system that remotely stores at least a portion of any required data). If a networked system, scanning/scope device 16 (or diagnostic system 18) may use network 20 to access remote server 22 that remotely stores at least a portion of the customer data (which will be discussed below in greater detail) on a remote storage device 24 (e.g., a hard disk drive, a tape drive, an optical drive, a RAID array, a random access memory (RAM), or a read-only memory (ROM), for example). Scanning/scope device 16 (or diagnostic system 18) may be hardwired (e.g., unshielded twisted pair, coaxial cable, or fiber-optic cable, for example) or wirelessly connected (e.g., 802.11a, 802.11b, or 802.11g, for example) to network 20.

Remote server 22 may be a web server running a network operating system, such as Microsoft Window 2000 Server™, Novell Netware™, or Redhat Linux™. Typically, remote server 22 also executes a web server application, such as Microsoft IIS™, Novell Webserver™, or Apache Webserver™, that allows for HTTP (i.e., HyperText Transfer Protocol) access to remote server 22 via network 20. Further, if scanning/scope device 16 (or diagnostic system 18) is networked, additional devices 26, 28, 30 may also be connected to remote server 22 (via network 20), allowing multiple systems 16, 18, 26, 28, 30 to share the customer data stored on remote server 22.

The instruction sets and subroutines of data alignment system 10, which are typically stored on a storage device 32 coupled to scanning/scope device 16 (or diagnostic system 18), are executed by one or more processors (not shown) and one or more memory architectures (not shown) incorporated into scanning/scope device 16 (or diagnostic system 18). Storage device 32 may be a hard disk drive, a tape drive, an optical drive, a RAID array, a random access memory (RAM), or a read-only memory (ROM), for example.

Figure 2:
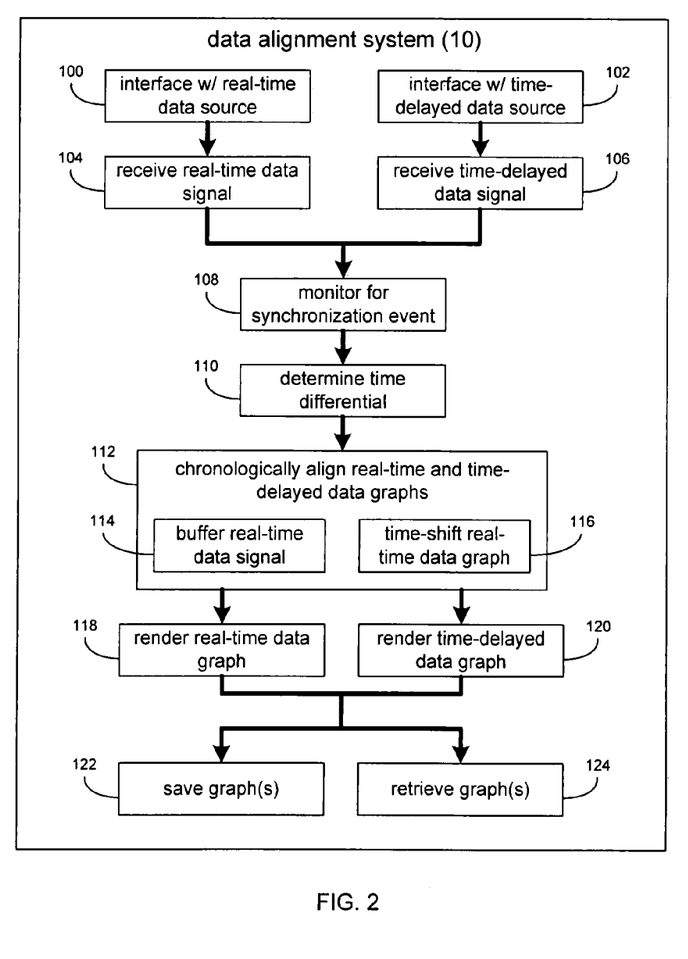
FIG. 2 is a flow chart of the data alignment system of FIG. 1.

Referring also to FIG. 2, when using data alignment system 10, technician 12 interfaces 100 scanning/scope device 16 (or diagnostic system 18) with a real-time data source (e.g., an ignition wire; to be discussed below) and interfaces 102 scanning/scope device 16 (or diagnostic system 18) with a time-delayed data source (e.g., an electronic control unit; to be discussed below) of the vehicle 14 being analyzed (e.g., motor vehicle 14).

Figure 3:
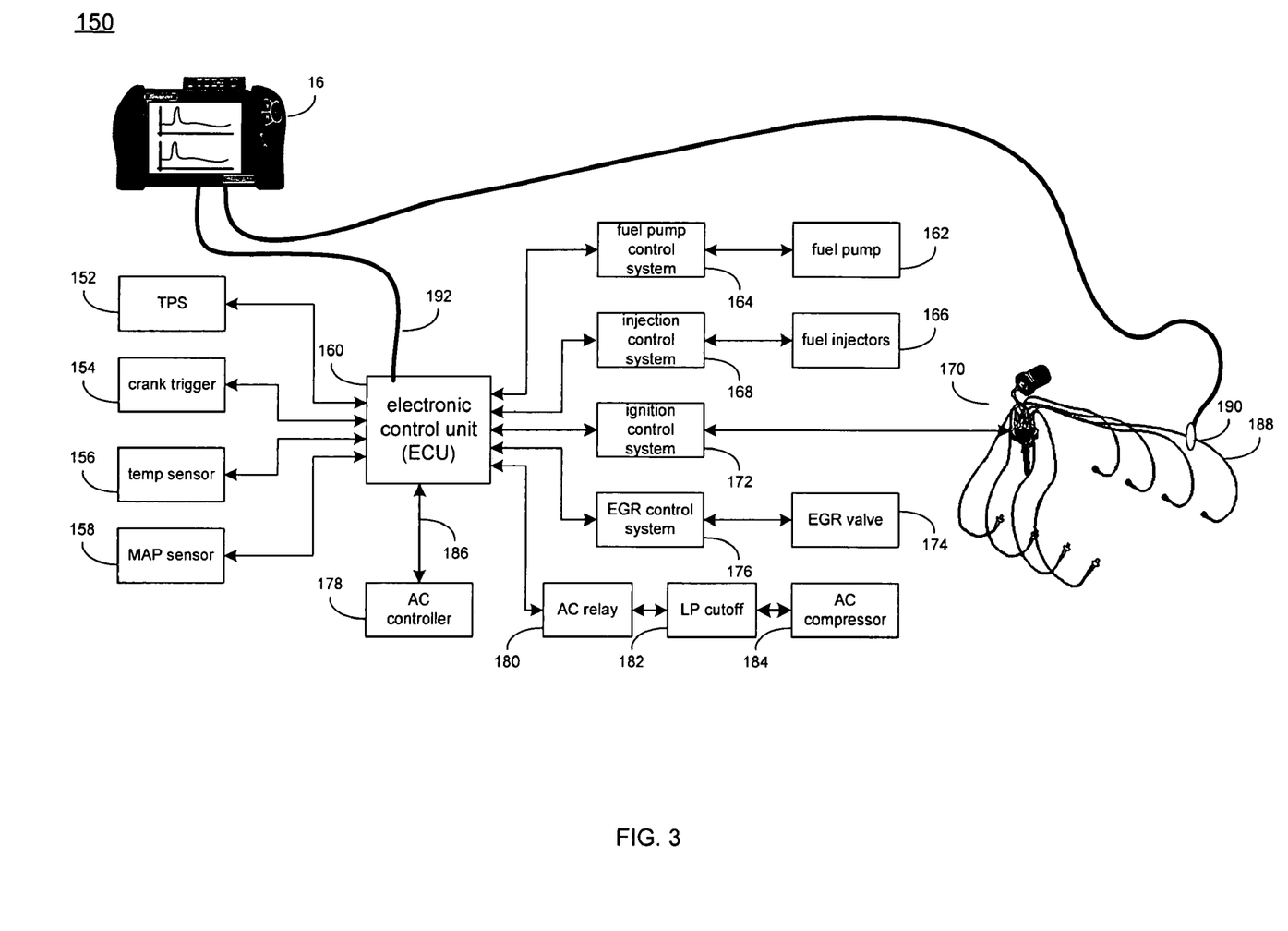
FIG. 3 is a schematic diagram of a motor vehicle interfaced with the data alignment system of FIG. 1.

Referring also to FIG. 3, there is shown a schematic-representation 150 of the electrical system of motor vehicle 14, illustrating the interconnection of various components, such as: throttle position sensor (TPS) 152; crank trigger 154; engine temperature sensor 156; manifold absolute pressure (MAP) sensor 158; electronic control unit (ECU) 160; fuel pump 162; fuel pump control system 164; fuel injectors 166; injection control system 168; ignition system 170; ignition control system 172; emission gas recirculation (EGR) valve 174; EGR control system 176; air conditioning (AC) controller 178; AC relay 180; low pressure (LP) cutoff 182; and AC compressor 184, for example.

The components shown in schematic diagram 150 may be electrical components (e.g., temp sensor 156), electrical-mechanical components (e.g., AC relay 180), or a portion of a wiring harness (e.g., wiring harness 186).

As discussed above, data alignment system 10 (via scanning/scope device 16 or diagnostic system 18) is interfaced with multiple data sources. Since these data sources typically include both real-time and time-delayed data sources (which provide real-time and time-delayed data signals, respectively), data alignment system 10 monitors the data signals received for the occurrence of a synchronization event, which is then used to chronologically align the misaligned data signals, thus allowing for the generation of chronologically aligned data graphs.

An example of a real-time data source is ignition wire 188 which is interfaced 100 with data alignment system 10 using an inductive ignition clamp 190. Specifically, the real-time data source type varies depending on the type of data that data alignment system 10 is monitoring. For example, when monitoring engine RPM, inductive ignition clamp 190 may be used to sense the high-voltage signal sent to a spark plug through ignition wire 188. Alternatively, a probe may be connected to the ignition coil to monitor the rate at which the electric field within the ignition coil collapses. By dividing this rate of collapse by the engine's number of cylinders, the engine RPM can be determined.

Alternatively, if the variable being monitored is alternator current output (as opposed to engine RPM), an inductive clamp may be used on the main output terminal of the alternator (not shown) to determine the current provided by the alternator. As is known in the art, various other current-based measurements (i.e., through the use of inductive clamps) and voltage-based measurements (i.e., through the use of voltage probes) may be made using various diagnostic access points located throughout the wiring harness(es) of vehicle 14.

Unlike inductive clamps and voltage probes that provide real-time data signals to technician 12, time-delayed data signals (from time-delayed data sources) are also available to technician 12. An example of such a time-delayed data source is ECU 160 of motor vehicle 14. ECU 160 is typically the primary computer that monitors and controls the overall operation of motor vehicle 14. As discussed above, ECU 160 is interconnected with various components, such as TPS 152, crank trigger 154, and engine temperature sensor 156, for example.

During operation of motor vehicle 14, ECU 160 collects data from these components and make some or all of it available to technician 12. Unfortunately, this data is typically time-delayed, in that the data currently available from ECU 160 may actually be several seconds old. Further, the exact extent of the delay is typically unknown, and the delay may vary depending upon the specific data stream being monitored (e.g., throttle position sensor data may be delayed only one second, while engine temperature sensor data may be delayed three seconds).

By interfacing 102 data alignment system 10 with ECU 160, the data stored on ECU 160 may be retrieved and analyzed. Typically, data alignment system 10 is interfaced to ECU 160 using a multiconductor cable 192 that is temporarily coupled to a service port (not shown) on the wiring harness of motor vehicle 14. However, other interface techniques (e.g., 802.11a, 802.11b, 802.11g, and infrared coupling, for example) are foreseeable and considered to be within the scope of this disclosure.

Typically, during operation of motor vehicle 14, the sensing components (e.g., TPS 152; crank trigger 154; engine temperature sensor 156; and/or MAP sensor 158) provide data to ECU 160. Additionally, other components of the system (e.g., EGR valve 174) may also provide a status feedback signal (i.e., data) to ECU 160. These various data signals are stored (on a temporary or permanent basis) on memory storage devices (e.g., registers, RAM architectures and/or ROM architectures, not shown) within ECU 160. For example, data within a normal operating range may be temporarily stored, and data outside of the normal operating range (e.g., excessively-high engine RPM, excessively-high vehicle speed, extreme overheating conditions and/or extended low oil pressure conditions, for example) may be stored for warranty/diagnostic purposes.

Figure 4:
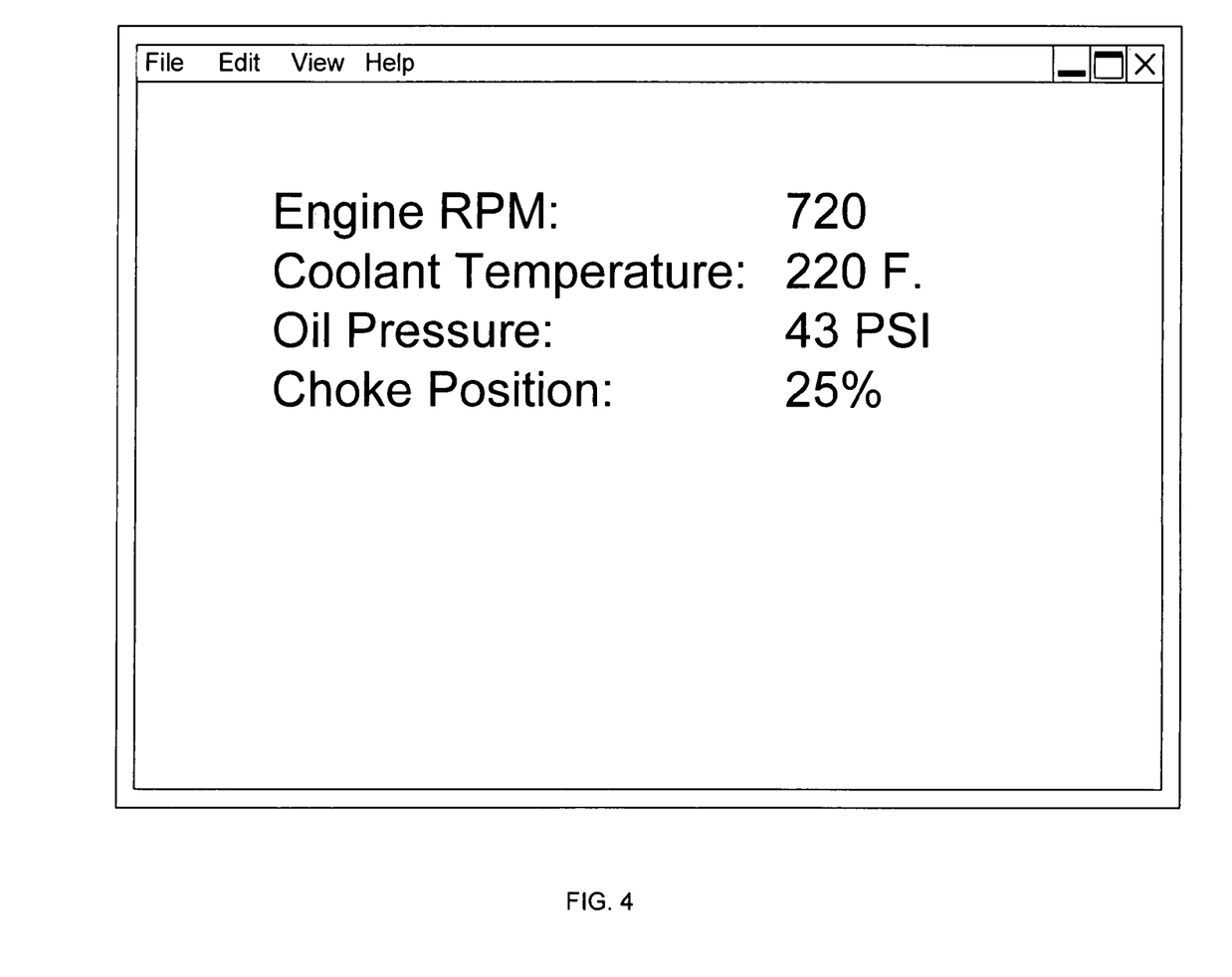
FIG. 4 is a diagrammatic view of a display screen rendered by the data alignment system of FIG. 1.

When data signals are stored on ECU 160, the data signals are typically downloadable (via e.g., cable 192 coupled to the wiring harness service port, not shown) and displayable on display device 34 (e.g., a CRT screen, an LCD screen, an LED display, or an LCD display, for example) of scanning/scope device 16 (or diagnostic system 18). These data signals maybe be presented as text-based data (as shown in FIG. 4) or graphically.

Figure 5:
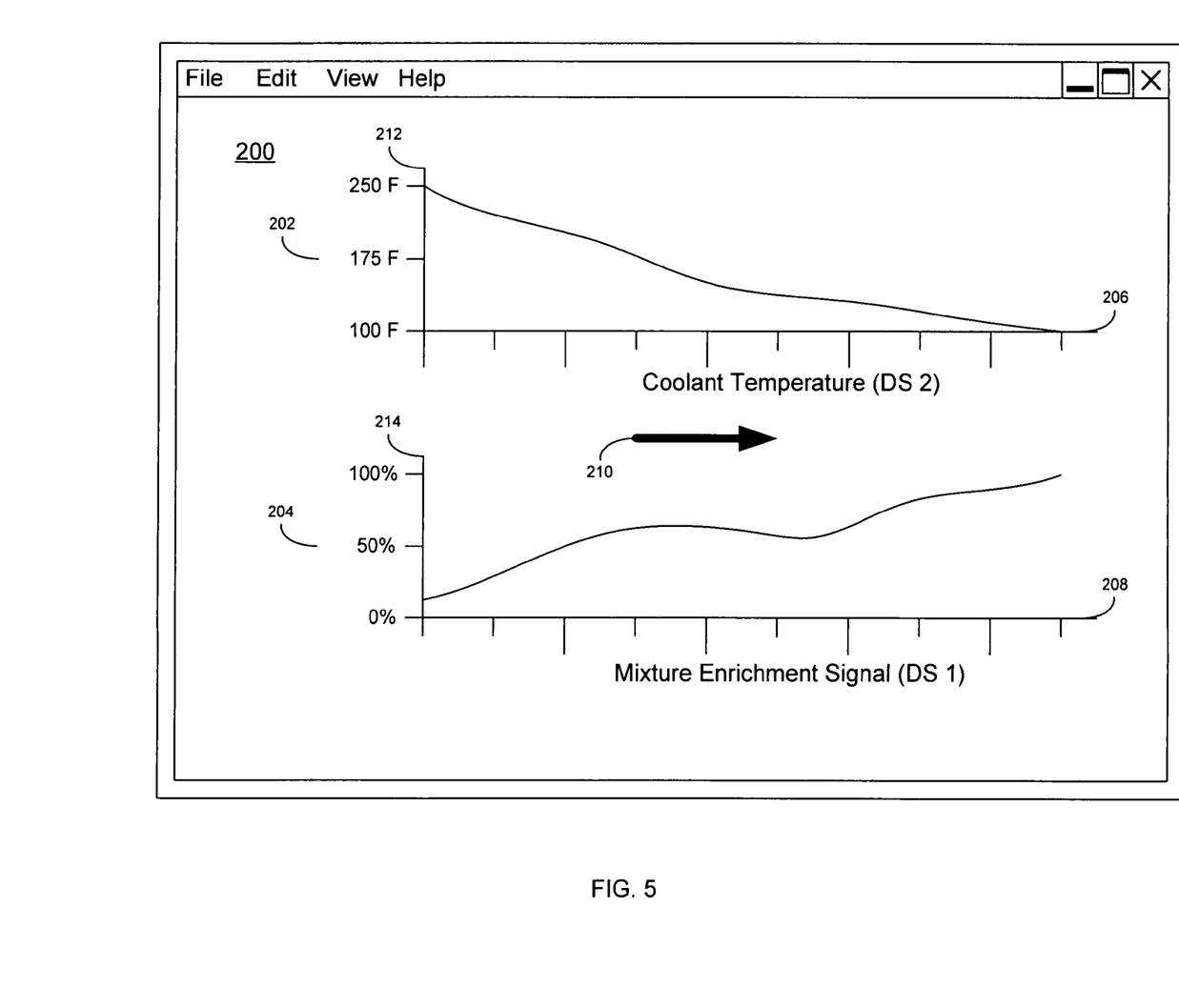
FIG. 5 is a diagrammatic view of a display screen rendered by the data alignment system of FIG. 1.

Referring also to FIG. 5, there is shown a typical graphical display 200 rendered on display device 34 of scanning/scope device 16 (or diagnostic system 18). When displaying data graphically, the data signals are typically plotted on a Cartesian X-Y coordinate grid in which the X-axis corresponds to a unit of time and the Y-axis corresponds to the amplitude of the value(s) being measured. For example, graphical display 200 includes two separate graphs, the first graph being a "Coolant Temperature" graph 202 and the second graph being a "Mixture Enrichment Signal" graph 204. For both graphs 202, 204, the x-axis 206, 208 (respectively) corresponds to time, and the line representing the data signal scrolls to the right (in the direction of arrow 210) as time passes.

When configuring data alignment system 10, the granularity of the x-axis increments may be varied to provide the desired level of historical data. For example, if the horizontal resolution is set relatively low (e.g., each increment equals one minute of time), graphs 202, 204 would provide technician 12 with just over nine minutes of historical data. However, if the horizontal resolution is set relatively high (e.g., each increment is equal to one second), graphs 202, 204 would only provide technician 12 with just over nine seconds of data.

Accordingly, when monitoring data signals that vary slowly (e.g., coolant temperature signals), it may be desirable to utilize a relatively low horizontal resolution, thus expanding the time axis (i.e., the x-axis) and enhancing the ability to track variables that change slowly with respect to time (i.e., have a lower mathematical derivative).

Conversely, when monitoring data signals that vary quickly (e.g., ignition signals), it may be desirable to utilize a relatively high horizontal resolution, thus shortening the time axis (i.e., the x-axis) and enhancing the ability to track signals that change quickly with respect to time (i.e., have a higher mathematical derivative).

As graph 202 is a time-based graphical representation of the coolant temperature, the y-axis 212 of graph 202 is divided into degree-based increments. As graph 204 is a time-based graphical representation of the mixture enrichment signal, the y-axis 214 of graph 204 is divided into percentage-based increments.

Figure 6:
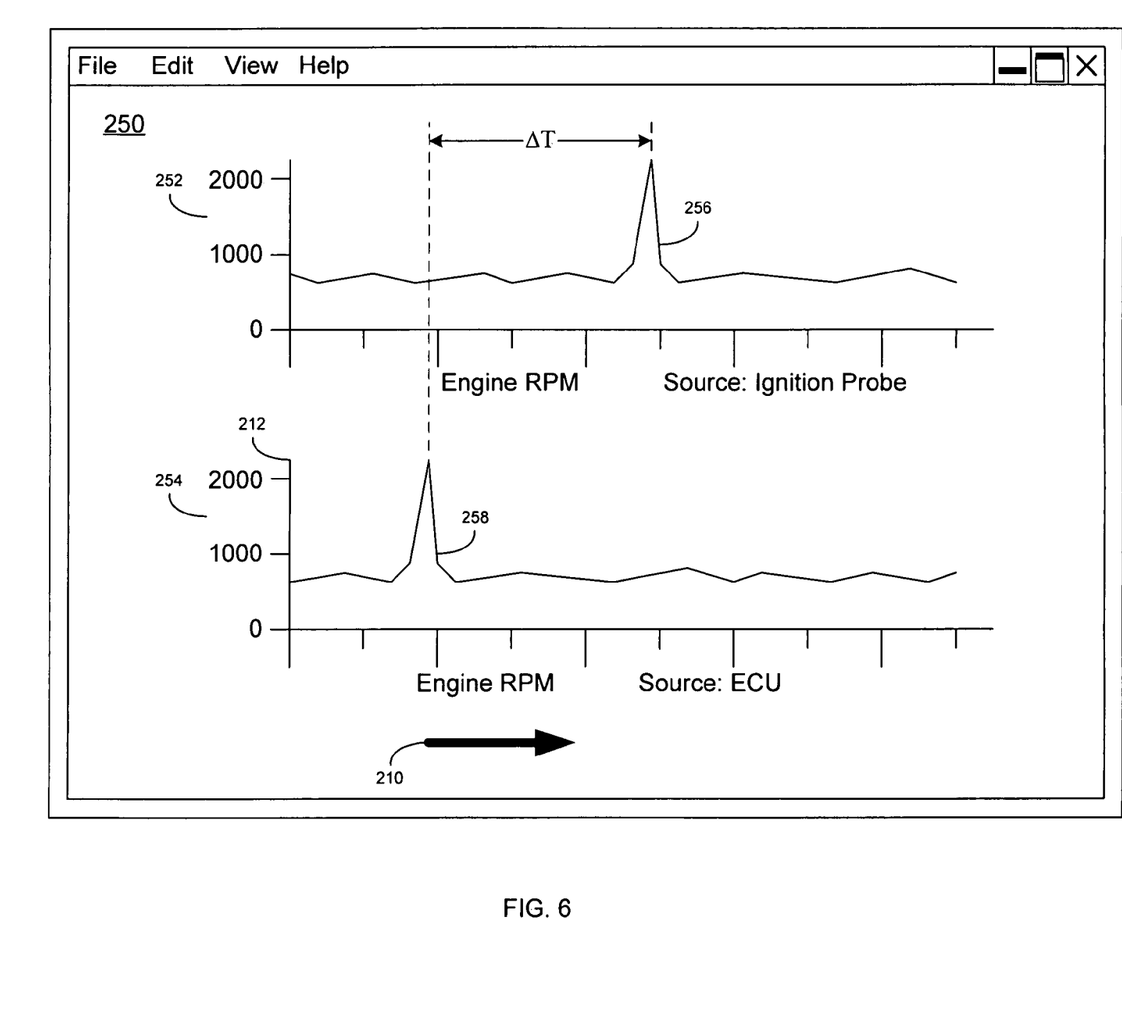
FIG. 6 is a diagrammatic view of a display screen rendered by the data alignment system of FIG. 1.

Referring also to FIG. 6, there is shown another example of a typical graphical display 250 rendered on display device 34. However, unlike display 200 (of FIG. 5), display 250 is used to display two separate graphs of the same data. Specifically, display 250 includes two graphs 252, 254, each representing the same piece of information, namely engine RPM. However, data graph 252 is representative of the real-time data signal received from the real-time data source (i.e., in this example, ignition wire 188), and data graph 254 is representative of the time-delayed data signal received from the time-delayed data source (i.e., in this example, ECU 160). As the data received from ECU 160 is time-delayed data and data curve 256 (of data graph 252) scrolls to the right with the passage of time, data curve 258 (of data graph 254) is time-shifted to the left (with respect to the data curve 256 of data graph 254), resulting in misaligned data graphs. The amount of this misalignment is known as the time differential (ΔT). Assuming that each X-axis increment represents one second, the value of time differential (ΔT) is three seconds (in this example).

When reviewing multiple misaligned data graphs of the same piece of information (e.g., engine RPM), it is often desirable to chronologically align the data graphs so that the relationship of the two data graphs (and, therefore, the two data signals) can be further examined. Accordingly, data alignment system 10 allows technician 12 to chronologically align multiple data graphs. This chronological alignment may be accomplished by time shifting the real-time data signal by an amount equal to the time differential (ΔT).

Figure 7:
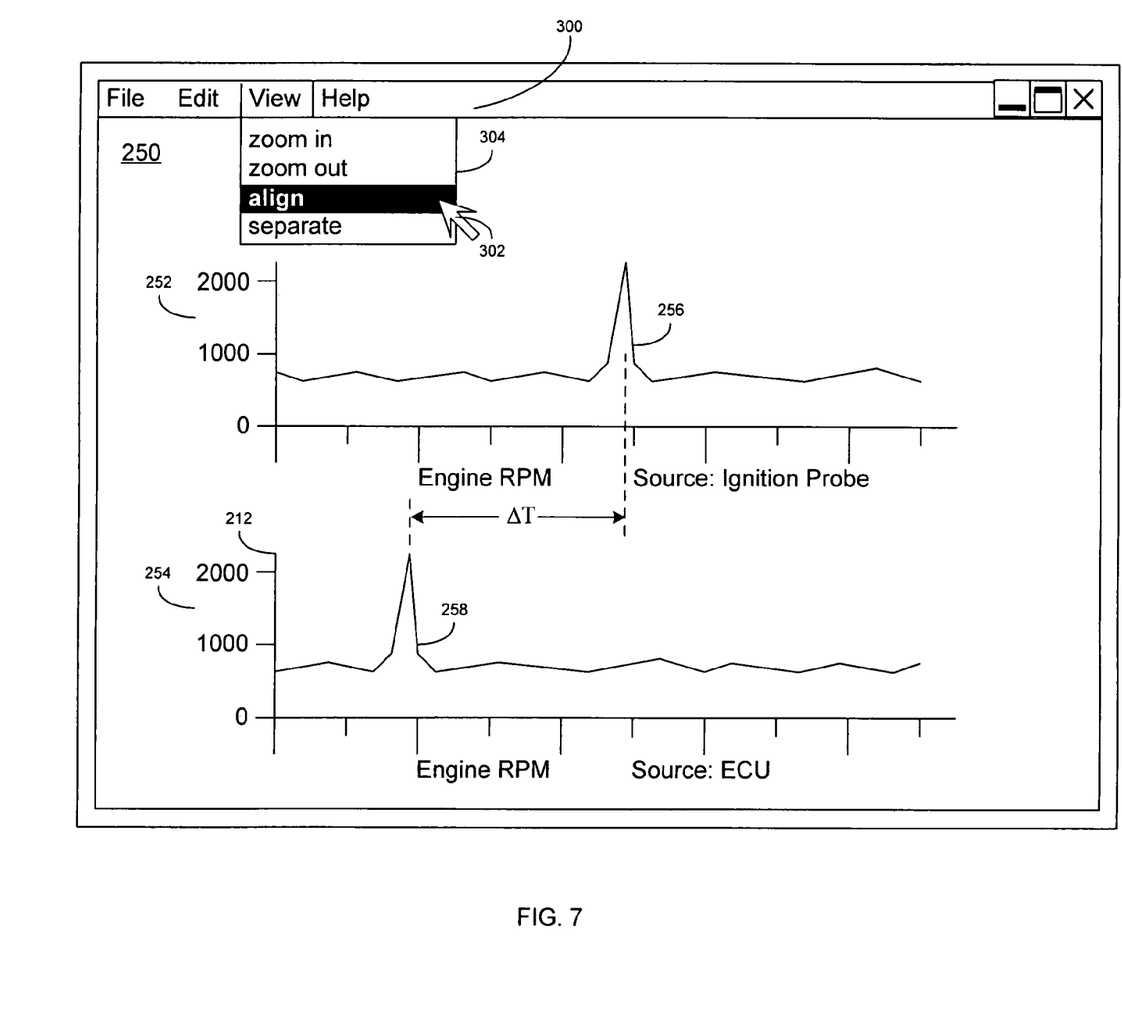
FIG. 7 is a diagrammatic view of a display screen rendered by the data alignment system of FIG. 1.

Referring to FIG. 7 and continuing with the above-stated example, assume that (as shown in FIG. 6) technician 12 is using data alignment system 10 to monitor a real-time engine RPM signal received 104 from ignition wire 188 and a time-delayed engine RPM signal received 106 from ECU 160.

The chronological alignment procedure may be initiated e.g., via menu-driven commands selected from a drop-down menu. For example, if technician 12 wanted to align data graphs 252, 254, technician 12 may select e.g., "View" from title bar 300 of graphical display 250 using pointer 302, and subsequently select "align" from drop-down menu 304. Data alignment system 10 would then monitor 108 the real-time data signal (received from the real-time data source) and the time-delayed data signal (received from the time-delayed data source) for the occurrence of a synchronization event. A synchronization event is a data anomaly within both received data signals (i.e., the real-time and time-delayed data signals).

In this particular example, technician 12 is monitoring engine RPM, which is typically in the range of 600-800 RPM. However, one portion of each data curve 256, 258 illustrates a short-duration engine RPM spike up to approximately 2200 RPM. This engine RPM spike will function as a synchronization event and allow data alignment system 10 to chronologically align data graphs 252, 254 and, therefore, data curves 256, 258.

Any anomaly within a data curve may function as a synchronization event, provided the anomaly is distinct enough that it can be easily discerned from the remaining portion of the data curve. Other examples of synchronization events within data signals may include sudden spikes in a measured current or a measure voltage. Alternatively, electromechanical data (e.g., throttle position or EGR valve position) may be monitored and used as synchronization events.

Continuing with the above-stated example, once the alignment procedure is initiated by technician 12, data alignment system 10 monitors 108 the real-time data signal and the time-delayed data signal for the occurrence of a synchronization event. Once a synchronization event is detected, the time differential (ΔT) is determined 110.

For example, data alignment system 10 may consider a synchronization event to be the point at which engine RPM surpasses 2200 RPM. Therefore, by comparing the real-time data signal and the time-delayed data signal, it is determined 110 that the time differential (ΔT) is three seconds, such that the time differential (ΔT) represents the difference in time between the point at which the synchronization event occurs within the real-time data signal and the point at which the synchronization event occurs within the time-delayed data signal.

The synchronization event discussed above may be a manually-initiated synchronization event or an automatically-initiated synchronization event. Continuing with the above-stated example in which the engine RPM spike is functioning as a synchronization event, this engine RPM spike may be manually-initiated by physically opening the throttle body. Alternatively, the engine RPM spike may be automatically-initiated by sending a signal to the ECU that temporarily raises the engine idle speed (i.e., resulting in an engine RPM spike).

Once the time differential (ΔT) is determined 110, real-time data graph 252 and time-delayed data graph 254 may be chronologically aligned 112. Continuing with the above-stated example, as time differential (ΔT) was determined to be three seconds, data alignment system 10 buffers 114 the real-time data signal by an amount equal to the time differential (ΔT), resulting in the generation of a time-shifted, real-time data signal. This buffering 114 results in the real-time data signal being delayed by an amount equal to the time differential (ΔT), which in turn results in the real-time data signal being delayed by the same amount as the time-delayed data signal.

For example and assuming a time differential (ΔT) of three seconds, each time a real-time data point is received at time t=(0), the time-delayed data point concurrently received would represent the value monitored at time t=(−3) i.e., three seconds prior. Therefore, instead of immediately plotting the real-time data point within real-time data graph 252, the real-time data point is buffered for three seconds. This buffering may be accomplished through the use of FIFO (i.e., first in/first out) queues, cache memory buffers, or RAM-based (i.e., random access memory based) buffers.

Figure 8:
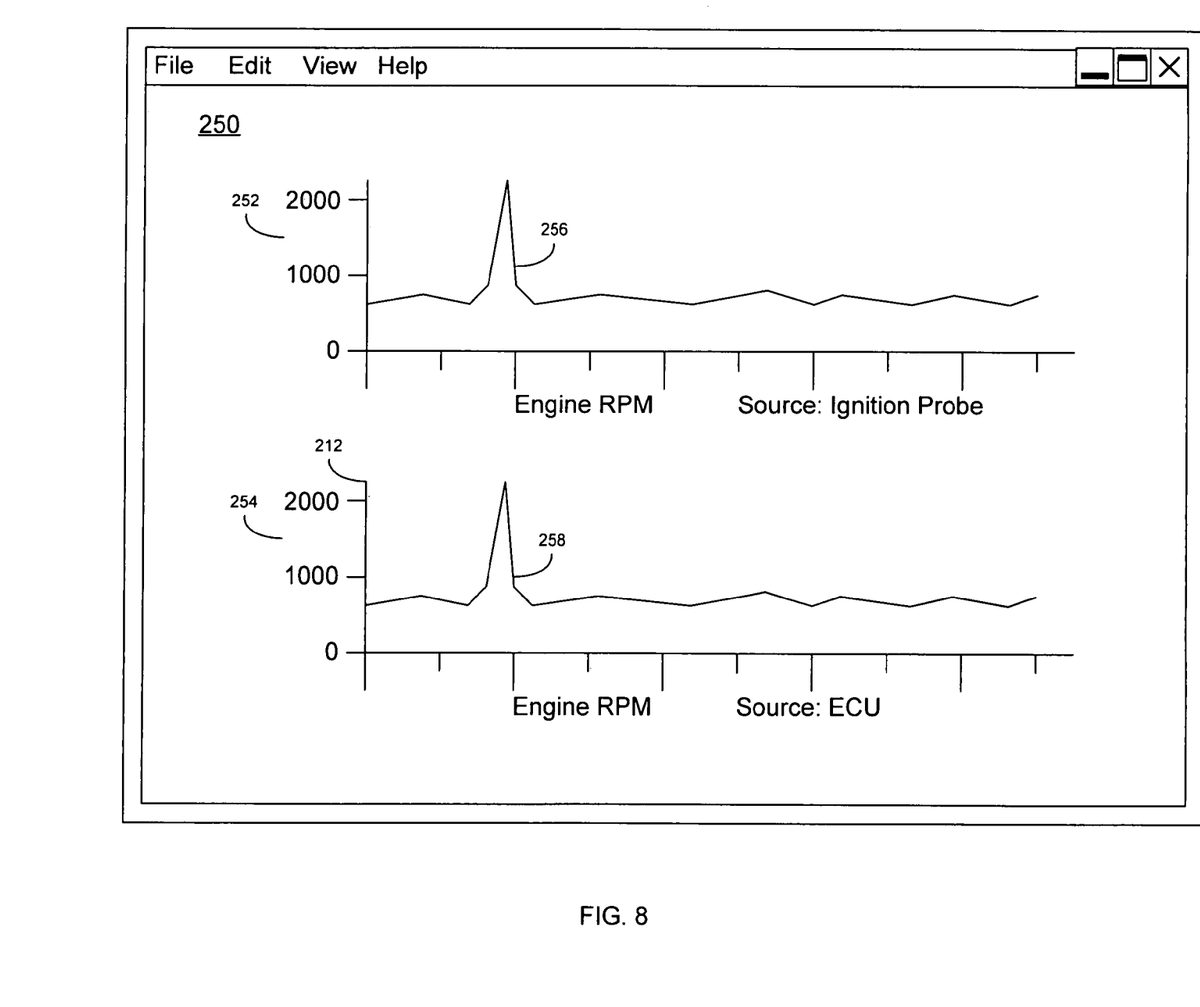
FIG. 8 is a diagrammatic view of a display screen rendered by the data alignment system of FIG. 1.

Accordingly, if the real-time data point is buffered for three seconds (generating a time-shifted real-time data point) and then plotted within real-time data graph 252, at the time the time-shifted real-time data point is plotted, the time-shifted real-time data point will represent the value that the monitored variable (e.g., engine RPM) was three seconds earlier. Accordingly, by buffering 114 the real-time data signal for an amount of time essentially equal to the time differential (ΔT), the real-time data curve 256 is time-shifted 116 (to the left along the x-axis) in an amount equal to the time differential (ΔT). This buffering 114 and shifting 116 results in the chronological alignment of real-time data curve 256 and time-delayed data curve 258 (as shown in FIG. 8).

Once buffered 114 and shifted 116, real-time data curve 256 (which is actually time-shifted by time differential (ΔT)) is rendered 118 on display device 34. Time-delayed data curve 258 is also rendered 120 on display device 34, such that real-time data curve 256 and time-delayed data curve 258 are chronologically aligned.

Figure 9:
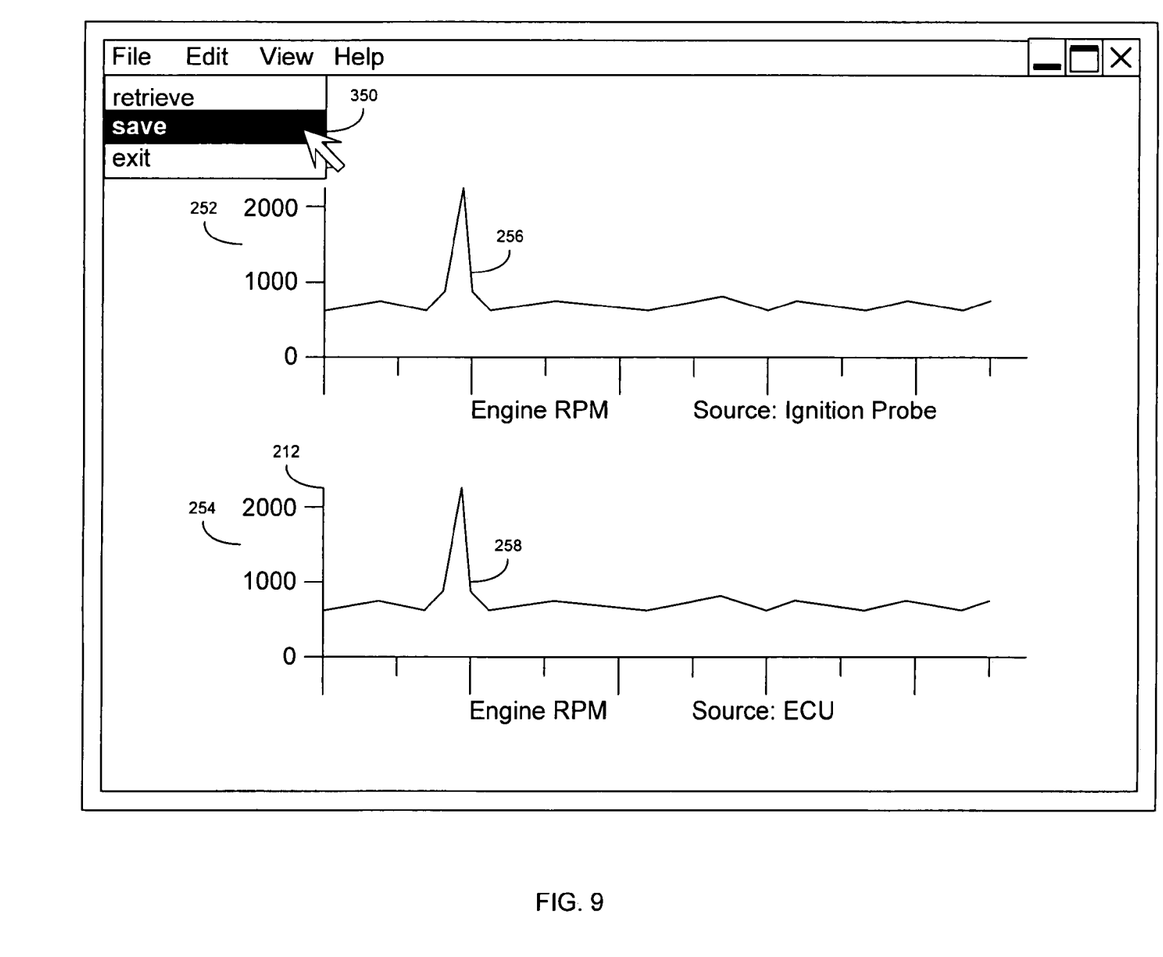
FIG. 9 is a diagrammatic view of a display screen rendered by the data alignment system of FIG. 1.

In addition to rendering and displaying data graphs, data alignment system 10 allows technician 12 to save 122 and retrieve 124 various data graphs. Referring also to FIG. 9, by selecting "save" from drop-down menu 350 (rendered by data alignment system 10), technician 12 may save 122 one or more of the data graphs shown on graphical display 250. These data graphs may be saved on local storage device 32 or (if scanning/scope device 16 or diagnostic system 18 are networked) on remote storage device 24.

Further, by selecting "retrieve" from drop-down menu 350, technician 12 may retrieve 124 the data graphs previously saved, thus allowing technician 12 to compare the data graph of previously recorded data signals to the data graph of currently available data signals.

While only two data graphs are shown to be included in graphical displays 200, 250, this is for illustrative purposes only, as the number of individual data graphs rendered may be increased based on the requirements of technician 12. Additionally, as data alignment system 10 is capable of displaying these additional data graphs, they may also be aligned with other graphs. For example, if data alignment system 10 rendered four individual data graphs, all four of these data graphs may be chronologically aligned.

The embodiments described herein may include or be utilized with any appropriate voltage or current source, such as a battery, an alternator, a fuel cell, and the like, providing any appropriate current and/or voltage, such as about 12 Volts, about 42 Volts and the like.

The embodiments described herein may be used with any desired system or engine. Those systems or engines may comprise items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

A number of implementations have been described. Nevertheless, it will be understood that various modifications may be made. Accordingly, other implementations are within the scope of the following claims.

What is claimed is:

1. A machine-implemented vehicular diagnostic method comprising:
   receiving by a data receiving device a real-time data signal from a real-time data source and a time-delayed data signal from a time-delayed data source;
   monitoring by a data receiving device the real-time data signal and the time-delayed data signal for the occurrence of a synchronization event;
   utilizing a differential determination device for determining a time differential between the occurrence of the synchronization event within the real-time data signal and the occurrence of the synchronization event within the time-delayed data signal; and
   chronologically aligning the real-time data signal and the time-delayed data signal by time shifting one of the real-time data signal and the time-delayed data signal by an amount of time essentially equal to the time differential.

2. The method of claim 1, wherein real-time data source is one or more diagnostic access points of a motor vehicle.

3. The method of claim 1, wherein the time-delayed data source is an electronic control unit within a motor vehicle.

4. The method of claim 1, wherein the synchronization event is a manually-initiated synchronization event.

5. The method of claim 1, wherein the synchronization event is an automatically-initiated synchronization event.

6. The method of claim 1, wherein the time differential is in the range of 0.0-3.0 seconds.

7. The method of claim 1, further comprising:
   simultaneously rendering, on a display device, a real-time data graph representative of the real-time data signal and a time-delayed data graph representative of the time-delayed data signal;
   wherein the real-time data graph and the time-delayed data graph are each plotted on a Cartesian plane having an x-axis representative of a unit of time and a y-axis representative of a signal amplitude.

8. The method of claim 7, further comprising:
   storing one or more of the data graphs on a data store.

9. The method of claim 8, wherein the data store is a local data store.

10. The method of claim 8, wherein the data store is a remote data store.

11. The method of claim 8, further comprising:
    retrieving one or more of the data graphs from the data store.

12. The method of claim 1, wherein chronologically aligning includes:
    buffering the real-time data signal by an amount of time essentially equal to the time differential to generate a time-shifted real-time data signal.

13. The method of claim 12, further comprising:
    simultaneously rendering, on a display device, a real-time data graph representative of the time-shifted real-time data signal and a time-delayed data graph representative of the time-delayed data signal.

14. The method of claim 1, wherein the real-time data graph and the time-delayed data graph are each plotted on a Cartesian plane having an x-axis representative of a unit of time and a y-axis representative of an amplitude, wherein chronologically aligning includes:
    shifting the real-time data signal along the x-axis by an amount of time essentially equal to the time differential.

15. A computer readable medium having a plurality of instructions stored thereon which, when executed by the processor, cause that processor to:
    receive a real-time data signal from a real-time data source and a time-delayed data signal from a time-delayed data source;
    monitor the real-time data signal and the time-delayed data signal for the occurrence of a synchronization event;
    determine a time differential between the occurrence of the synchronization event within the real-time data signal and the occurrence of the synchronization event within the time-delayed data signal; and
    chronologically aligning the real-time data signal and the time-delayed data signal by time shifting one of the real-time data signal and the time-delayed data signal by an amount of time essentially equal to the time differential.

16. The computer readable medium of claim 15, wherein real-time data source is one or more diagnostic access points of a motor vehicle.

17. The computer readable medium of claim 15, wherein the time-delayed data source is an electronic control unit within a motor vehicle.

18. The computer readable medium of claim 15, wherein the data event is a manually-initiated synchronization event.

19. The computer readable medium of claim 15, wherein the data event is an automatically-initiated synchronization event.

20. The computer readable medium of claim 15, wherein the time differential is in the range of 0.0-3.0 seconds.

21. The computer readable medium of claim 15, further comprising instructions for:
    simultaneously rendering, on a display device, a real-time data graph representative of the real-time data signal and a time-delayed data graph representative of the time-delayed data signal;
    wherein the real-time data graph and the time-delayed data graph are each plotted on a Cartesian plane having an x-axis representative of a unit of time and a y-axis representative of a signal amplitude.

22. The computer readable medium of claim 21, further comprising instructions for:
    storing one or more of the data graphs on a data store.

23. The computer readable medium of claim 22, wherein the data store is a local data store.

24. The computer readable medium of claim 22, wherein the data store is a remote data store.

25. The computer readable medium of claim 22, further comprising instructions for:
  retrieving one or more of the data graphs from the data store.

26. The computer readable medium of claim 15, wherein the instructions for chronologically aligning include instructions for:
  buffering the real-time data signal by an amount of time essentially equal to the time differential to generate a time-shifted real-time data signal.

27. The computer readable medium of claim 26, further comprising instructions for:
  simultaneously rendering, on a display device, a real-time data graph representative of the time-shifted real-time data signal and a time-delayed data graph representative of the time-delayed data signal.

28. The computer readable medium of claim 15, wherein the real-time data graph and the time-delayed data graph are each plotted on a Cartesian plane having an x-axis representative of a unit of time and a y-axis representative of an amplitude, wherein the instructions for chronologically aligning include instructions for:
  shifting the real-time data signal along the x-axis by an amount of time essentially equal to the time differential.

29. A data alignment system comprising:
  a data receiving device for receiving a real-time data signal from a real-time data source and a time-delayed data signal from a time-delayed data source;
  a data monitoring device for monitoring the real-time data signal and the time-delayed data signal for the occurrence of a synchronization event;
  a differential determination device for determining a time differential between the occurrence of the synchronization event within the real-time data signal and the occurrence of the synchronization event within the time-delayed data signal; and
  chronologically aligning the real-time data signal and the time-delayed data signal by time shifting one of the real-time data signal and the time-delayed data signal by an amount of time essentially equal to the time differential.

30. The system of claim 29, further comprising:
  a display device for simultaneously rendering a real-time data graph representative of the real-time data signal and a time-delayed data graph representative of the time-delayed data signal;
  wherein the real-time data graph and the time-delayed data graph are each plotted on a Cartesian plane having an x-axis representative of a unit of time and a y-axis representative of a signal amplitude.

31. The system of claim 29, wherein the alignment device includes:
  a data buffer for buffering the real-time data signal by an amount of time essentially equal to the time differential to generate a time-shifted real-time data signal.

32. The system of claim 31, further comprising:
  a display device for simultaneously rendering a real-time data graph representative of the time-shifted real-time data signal and a time-delayed data graph representative of the time-delayed data signal.

* * * * *

UNITED STATES PATENT AND TRADEMARK OFFICE
CERTIFICATE OF CORRECTION

| | |
|---|---|
| PATENT NO. | : 7,512,156 B2 |
| APPLICATION NO. | : 11/010288 |
| DATED | : March 31, 2009 |
| INVENTOR(S) | : Gerry Beronja |

It is certified that error appears in the above-identified patent and that said Letters Patent is hereby corrected as shown below:

In Column 10, Line 33, change "aligning" to --align.--.

In Column 12, Line 6, please add --an alignment device for-- at the beginning of the line.

Signed and Sealed this

Fourteenth Day of July, 2009

JOHN DOLL
*Acting Director of the United States Patent and Trademark Office*